United States Patent Office 3,776,969
Patented Dec. 4, 1973

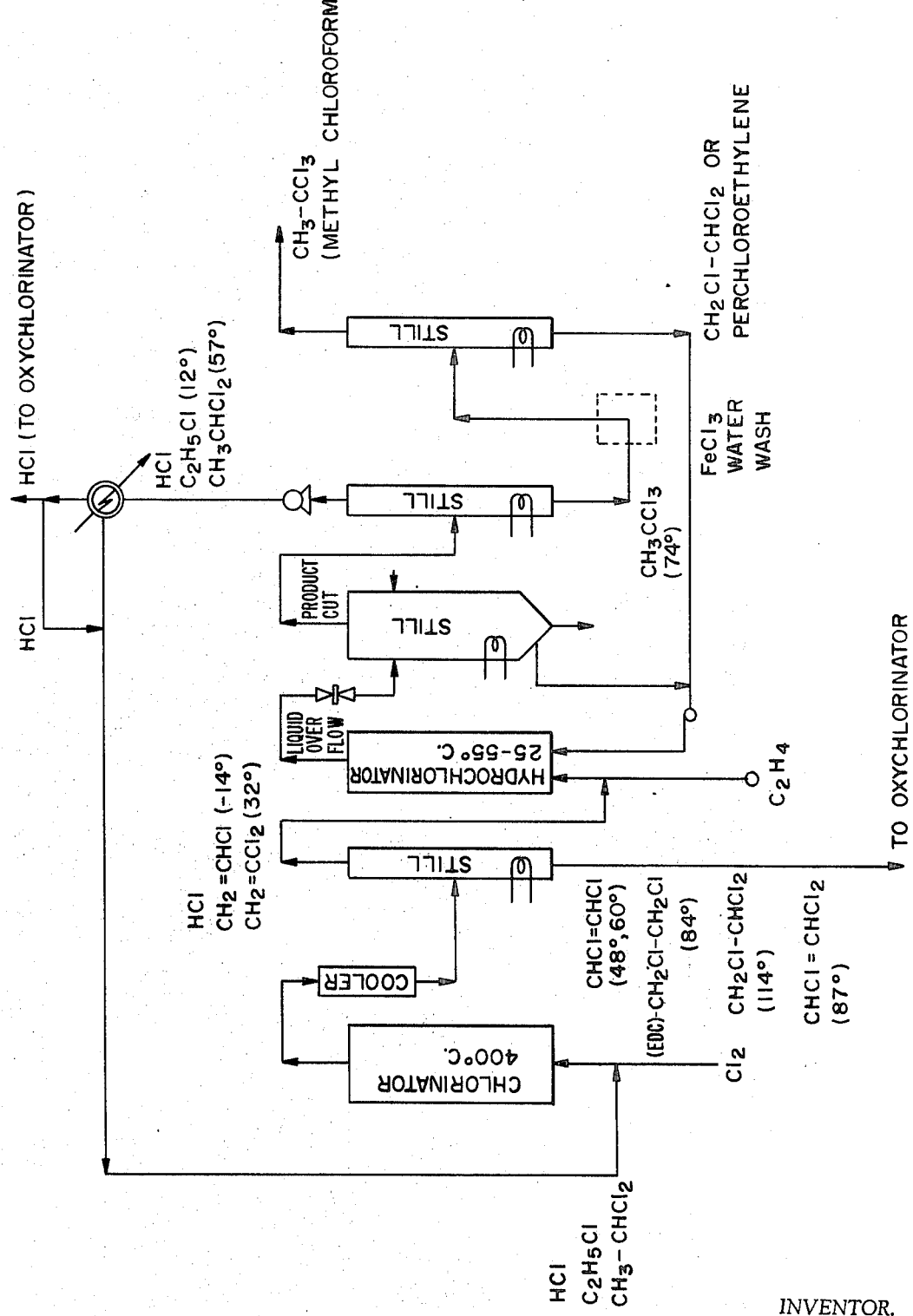

3,776,969
PRODUCTION OF METHYL CHLOROFORM FROM ETHYLENE AND CHLORINE
Walter Lobunez, Princeton, N.J., assignor to FMC Corporation, New York, N.Y.
Filed Dec. 18, 1969, Ser. No. 886,070
Int. Cl. C07c 17/00
U.S. Cl. 260—668 R    7 Claims

ABSTRACT OF THE DISCLOSURE

Methyl chloroform is made from ethylene and chlorine by introducing the ethylene into a hydrochlorinator containing a suspension of a hydrochlorination catalyst in an anhydrous carrier, most preferably 1,1,2-trichloroethane or perchloroethylene, together with a stream obtained from a high-temperature chlorinator, which contains the vinyl chloride, vinylidene chloride and HCl produced therein to obtain a mixture of ethyl chloride, 1,1-dichloroethane and methyl chloroform. After separation of the products, the ethyl chloride and 1,1-dichloroethane are recirculated back to the chlorinator. The mixed products from the high-temperature chlorinator are preferably fractionated to remove higher boilers, in particular the small amount of 1,2-dichloroethane (EDC) which is present, and which is extremely difficult to separate from methyl chloroform.

FIELD OF THE INVENTION

This invention is concerned with the production of methyl chloroform, from ethylene and chlorine.

RELATED APPLICATIONS

This application is related to my copending application filed Nov. 14, 1969, Ser. No. 876,738 and entitled: "Process for Preparing Vinyl Chloride and Vinylidene Chloride," and my copending applications filed of even date herewith and entitled: "Preparation of 1,1-Dichloroethane from Vinyl Chloride," Ser. No. 886,069, and "Hydrochlorination of Vinylidene Chloride to Produce Methyl Chlorform," Ser. No. 886,071.

BACKGROUND OF THE INVENTION

Methyl chloroform—1,1,1-trichloroethane—is a solvent which is extensively used for dry cleaning and in other areas where excellent grease solvency is desired. It has been made by a number of techniques. The first commercially successful method involved the hydrochlorination of vinylidene chloride in the presence of a Friedel-Crafts catalyst, most preferably ferric chloride (Nutting et al. U.S. Pat. 2,209,000). More recently, it has been suggested (Vogt U.S. Pat. 3,065,280) that the vinylidene chloride could be made by deeply chlorinating ethylene to 1,1,2-trichloroethane, which can be cracked to vinylidene chloride by reaction with caustic, and then hydrochlorinating the vinylidene chloride with the HCl from the chlorination reaction. The process has the disadvantage that one-fourth of the chlorine charged is lost as inorganic chloride. The process is not anhydrous, so that careful, expensive drying of the stream from the dehydrochlorinator is essential to prevent excessive equipment corrosion. Finally, substantial quantities of tar are produced.

A second approach is the direct chlorination of 1,1-dichloroethane (DCE) at elevated temperatures (see Benner et al. U.S. Pat. 3,059,035); the DCE is obtained by hydrochlorinating vinyl chloride. However, the process has the disadvantage that vinyl chloride is a much more expensive starting material than ethylene. Finally, sufficient heavies are produced so that the yields are of the order of only 80% of feed stocks, a significant cost factor.

A third approach (Jordan Jr. et al. U.S. Pat. 3,304,337) involves the chlorination of ethane, together with recycle ethyl chloride 1,1-dichloroethane, and other materials. This procedure has the disadvantage that it produces a very mixed bag of products, some of which are very difficult to process.

OBJECTS OF THE INVENTION

The principal object of the present invention is the production of methyl chloroform from the very basic and inexpensive materials ethylene and chlorine, with minimal losses of chlorine and hydrocarbon values, in a simple, essentially two-stage reaction.

STATEMENT OF THE INVENTION

In accordance with the present invention, I (1) feed chlorine, ethyl chloride, 1,1-dichloroethane and HCl into a reaction zone maintained at about 340 to 450° C. to produce a product rich in vinyl chloride and vinylidene chloride, preferably treat the product to remove any 1,2-dichloroethane (ethylene dichloride-EDC) which may be present; (2) hydrochlorinate the vinyl chloride and vinylidene chloride produced, and ethylene, to produce respectively 1,1-dichloroethane, methyl chloroform and ethyl chloride preferably in the same reaction at the same time, and preferably in the presence of a Friedel-Crafts catalyst carried in a liquid carrier which is either 1,1,2-trichloroethane or perchloroethylene, at a temperature below about 75° C. and most preferably between about 25 and 55° C.; (3) separate and recover the methyl chloroform; and (4) recycle the ethyl chloride, 1,1-dichloroethane and excess HCl back to the chlorinator.

DESCRIPTION OF THE DRAWING

The drawing attached hereto is a flow sheet of the invention.

DETAILED DESCRIPTION OF THE INVENTION

In accordance with my invention, I use as basic raw materials ethylene and chlorine, introduced into the process at entirely different points to minimize the formation of 1,2-dichloroethane (EDC), the principal product formed when ethylene reacts with chlorine.

The chlorine is introduced into a recycle stream from a hydrochlorinator into which ethylene is introduced along with all or part of the product stream from the chlorinator, which recycle stream consists essentially of ethyl chloride, 1,1-dichloroethane (DCE) and HCl. In brief, the step involves passing chlorine gas, ethyl chloride, and 1,1-dichloroethane, along with HCl as a diluent, into a reaction zone maintained at about 340 to 450° C., using a molar ratio of chlorine to organics in the recycle stream of between about 1 to 2 and 3 to 1.0, and most preferably at least about 3 to 4 to minimize recycle of 1,1-dichloroethane. The reactants are preferably premixed before being subjected to the high temperatures.

The resultant gas stream consists primarily of vinyl chloride, vinylidene chloride and HCl, with small amounts of unreacted feed materials, particularly where the chlorine molar ratio is below about 3 to 4. Small amounts of ethylene are sometimes present, due to cracking, along with trichloroethylene, and cis- and trans-dichloroethylenes are also produced, together with 1,1,2 - trichloroethane. Other products are under 5%.

While the total gas stream from the chlorinator, after cooling, can be introduced into the hydrochlorinator, it is preferably distilled, to separate the heavies from the lights, if any 1,2-dichloroethane (EDC) appears in the gas stream. This is because it boils so close to methyl chloroform that it is difficult to separate from it. The lights (HCl, vinyl chloride and vinylidene chloride) and any ethylene or unreacted ethyl chloride) are fed into the hydrochlorinator; the heavies may be variously treated. If they contain large quantities of unreacted 1,1-dichloroethane (DCE), this is separated from the rest of the heavies, and returned to the chlorinator. The other heavies are most preferably recovered by feeding into an oxychlorination unit, where they can be converted into tri- and perchloroethylene, or into 1,1,2-trichloroethane.

The vinyl chloride-vinylidene chloride overhead stream is then fed into a hydrochlorinator, together with ethylene, where they react with HCl to produce 1,1-dichloroethane from the vinyl chloride, methyl chloroform from the vinylidene chloride and ethyl chloride from the ethylene. This hydrochlorinator may be run in known fashion, using a suspension of hydrochlorination catalyst—most preferably a Friedel-Crafts catalyst such as ferric chloride—suspended in methyl chloroform or 1,1-dichloroethane as the carrier. I have found that much faster reaction rates are obtained, and much longer catalyst life, if the carrier is a high-boiling more highly chlorinated two-carbon liquid of the group consisting of 1,1,2-trichloroethane and perchloroethylene. The hydrochlorination of vinyl chloride in these carriers is described and claimed in my copending application of even date herewith and entitled: "Preparation of 1,1-Dichloroethane from Vinyl Chloride"; the hydrochlorination of vinylidene chloride in these carriers is described and claimed in my copending application of even date herewith and entitled: "Hydrochlorination of Vinylidene Chloride to Produce Methyl Chloroform."

The same advantages are obtained in the hydrochlorination of ethylene. However, I have observed that because of the greater volatility of ethylene, good, rapid mixing is important in ensuring sufficient contact time where ethylene is being hydrochlorinated. In practice, this can be obtained by conducting the reaction in long, narrow reactors with fast flow.

The catalyst can be any known hydrochlorination catalyst. The best and cheapest catalyst is anhydrous ferric chloride. It is useful in amounts as low as a few tenths of a percent; but about 1 to 5% of catalyst is desirable for optimum throughput of product.

The hydrochlorination may be run as a batch reaction, in which even the reaction should be stopped and products stripped before the carrier becomes too diluted with product. Most advantageously, the process is run continuously, as shown on the flow sheet.

The reactants are fed into the bottom of a long, narrow column, maintained at under 75° C., and preferably between about 25 and 55° C. The column contains a suspension of the catalyst in the carrier, preferably either perchloroethylene or 1,1,2-trichloroethane. The feed rate is such as to maintain the desired hold time in the reactor; a desirable rate is from about 5 to 20% of the liquid volume per hour. The reactor is permitted to overflow at the addition rate. This overflow passes to a still, where the HCl, ethyl chloride, 1,1-dichloroethane and methyl chloroform are separated overhead, while the carrier liquid and catalyst are returned to the hydrochlorinator. The overhead is again distilled, retaining the methyl chloroform as bottoms, and returning the HCl, ethyl chloride and 1,1-dichloroethane to the chlorinator. The methyl chloroform product may be washed to remove any ferric chloride mechanically trapped therein, and then given a final clean-up distillation.

The process has the great advantage over heretofore practiced processes that the only ethylene coming into contact with chlorine is the small quantity that is not hydrochlorinated to ethyl chloride, so that formation of 1,2-dichloroethane (EDC) is minimized, thereby sharply reducing product contamination. There is essentially no loss of either chlorine or hydrocarbon values, except for small mechanical losses, and minimum bottoms losses. Finally, conversions per pass are good.

EXAMPLES OF THE INVENTION

The following typical examples of the invention are given by way of illustration and not by way of limitation.

The reaction system used in this work consisted of an empty Ni-tube chlorination reactor, 1" O.D., 0.81" I.D., 51" long, with 35" of the length surrounded by furnaces. The reactants could be introduced into the reactor together or separately through the tubes connected to the reactor. A preferable way of introducing the reactants was to introduce chlorine with the diluent HCl through a center tube (0.25" O.D. Monel tube) and ethyl chloride and the recycle 1,1-dichloroethane through a side tube (0.5" O.D. stainless steel tube). The inlet end of the center tube was approximately 2" further in the reactor than the opening of the side tube. The amounts of gaseous reactants introduced into the reactor were measured with flowmeters and liquid reactants with a balance. Reaction temperatures were measured with thermocouples positioned in a 0.25" O.D. thermowell. The products of chlorination and dehydrochlorination that were formed in the Ni-tube were directed into the hydrochlorination reactor that consisted of a glass tube reactor (1.25" I.D.) sealed at the bottom and having an overflow outlet at the upper end. The length from the bottom to the overflow tube was 29". The reactants were introduced into the bottom part of reactor through a Monel tube, 0.25" O.D., inserted through the top of the reactor. This tube served also as a shaft for the mixing blades made of Teflon and was connected at its upper end to a vibromixer. The reaction temperature in this reactor was measured with thermocouples placed in the glass thermowell inserted in the reactor and was regulated by use of tubular furnace and air cooling. Ethylene gas could be introduced into this reactor through a tube connected to the tube between the two reactors. The reaction products emerged through the overflow tube, passed through a heated gas sampling tube and an alkali or water trap for collecting HCl and were collected or vented. There was also a side tube for sampling the liquid reactants and products mixture in the upper part of the reactor. HCl was determined volumetrically and the rest of the products chromatographically. Before starting the reaction, the second reactor was filled with 500 ml. of a diluent (preferably 1,1,2-trichloroethane or perchloroethylene) to which a desired amount of the anhydrous $FeCl_3$ catalyst was added. The diluents were distilled before the beginning of experiments.

Examples 1 to 3 illustrate chlorination and direct hydrochlorination, without addition of ethylene.

EXAMPLE 1

The following reactants (in mmol./min.) were introduced into the chlorination reactor:

Ethyl chloride _____ 5.2
1,1-dichloroethane _____ 6.7
Chlorine _____ 8.3
Hydrogen chloride _____ 16.3

The last two reactants were introduced through the center tube, and the first two through the side inlet tube. The reaction temperature at the hottest spot in reactor was 419° C. The products emerging from the chlorinator were introduced into the hydrochlorinator containing 500 cc. of 1,1,2-trichloroethane with 25 g. of $FeCl_3$ kept suspended in it with the help of a vibromixer. The reaction products obtained from the second reactor contained (in weight percent):

1,1-dichloroethane _____ 59.2
Methyl chloroform _____ 34.9
Unreacted vinylidene chloride _____ 2.2
Other products _____ 3.7

EXAMPLE 2

The same procedure was used in this example as in Example 1. The reactants were:

| | |
|---|---|
| Ethyl chloride | 5.1 |
| 1,1-dichloroethane | 6.1 |
| Chlorine | 8.4 |
| Hydrogen chloride | 15.7 |

Maximum reaction temperature in the chlorinator, 419° C. Reaction temperature in the hydrochlorinator, 48° C. The products distribution:

| | |
|---|---|
| Methyl chloroform | 42.3 |
| 1,1-dichloroethane | 47.7 |
| Unreacted vinylidene chloride | 2.4 |
| Other products | 8.6 |

EXAMPLE 3

Reactants:

| | |
|---|---|
| Ethyl chloride | 5.2 |
| 1,1-dichloroethane | 7.0 |
| Chlorine | 9.5 |
| Hydrogen chloride | 16.6 |

Reaction temperature in the chlorinator, 415° C. maximum, and in the hydrochlorinator, 44° C. Products:

| | |
|---|---|
| Methyl chloroform | 46.7 |
| 1,1-dichloroethane | 40.5 |
| Unreacted vinylidene chloride | 2.7 |
| Unreacted vinyl chloride | 1.6 |
| Other products | 8.6 |

Examples 4, 5 and 6 illustrate the hydrochlorination of ethylene by itself. In these examples, 16 g. of ferric chloride was suspended in the diluent.

TABLE I
Hydrochlorination of Ethylene in 1,1,2-Trichloroethane

| Examples | 4 | 5 | 6 |
|---|---|---|---|
| Reactants (in mmol/min.): | | | |
| $C_2H_4$ | 13.5 | 9.3 | 10.5 |
| HCl | 25.0 | 17.4 | 12.9 |
| Reaction temperature, °C | 38–40 | 70 | 70 |
| Percent $C_2H_4$ converted to $C_2H_5Cl$ (per single pass) | 98.5 | 95.0 | 94.2 |

EXAMPLE 7

Using the same procedure and catalyst concentration as in Examples 4, 5 and 6, I fed a distilled mixture from a chlorinator run, in the manner above described, into the hydrochlorination reactor, along with ethylene. The mixture was fed at a rate which gave the following feed rate, in mmol/mixture:

| | |
|---|---|
| Ethylene | 7.8 |
| Vinyl chloride | 4.3 |
| Vinylidene chloride | 3.7 |
| Hydrogen chloride | 30.0 |

The temperature was held between 38 and 50° C. over a period of five hours. The product mix over the period was as follows (weight percent):

| | |
|---|---|
| Ethyl chloride | 34.6 |
| 1,1-dichloroethane | 29.6 |
| Methyl chloroform | 32.8 |
| Unreacted ethylene | 0.7 |
| Unreacted vinyl chloride | 0.5 |
| Unreacted vinylidene chloride | 1.8 |

Very similar results were obtained using perchloroethylene as the carrier for the catalyst. Reduction of catalyst resulted in more unreacted material at these rates; it was necessary to slow the feed rate to keep down the unreacted ratio.

CHLORINATION EXAMPLES

A group of examples is given here to illustrate the results obtained in chlorinating typical streams from the hydrochlorination step.

TABLE II
Chlorination of Mixtures of Ethyl Chloride and 1,1-Dichloroethane in an Empty Ni-Tube Reactor

| Examples | 8 | 9 | 10 | 11 | 12 | 13 |
|---|---|---|---|---|---|---|
| Reactants (in mmol/min.): | | | | | | |
| Ethyl chloride | 5.0 | 4.9 | 5.3 | 4.7 | 5.2 | 5.3 |
| Dichloroethane | 6.2 | 3.8 | 5.1 | 1.7 | 6.8 | 6.8 |
| $Cl_2$ | 9.0 | 9.0 | 9.0 | 8.7 | 6.0 | 6.0 |
| Diluent, HCl | 6.2 | 21.0 | 21.0 | 21.0 | 7.0 | 7.0 |
| Ethylene | | | | | | 0.5+ |
| Reaction temperature, °C | 353–429 | 402–438 | 402–438 | 415–445 | 345–395 | 345–395 |
| Products (weight percent): | | | | | | |
| Vinylidene chloride | 56.2 | 49.8 | 47.7 | 44.8 | 28.4 | 16.9 |
| Vinyl chloride | 24.6 | 36.1 | 35.1 | 38.3 | 31.6 | 22.6 |
| Ethylene | 0.9 | 4.7 | 4.9 | 5.4 | 0.0 | 0.0 |
| Cis- and trans-dichloroethylene | 8.6 | 1.6 | 3.0 | 1.4 | 0.0 | 0.0 |
| Trichloroethylene | 1.5 | 3.0 | 3.3 | 7.3 | 0.4 | 0.0 |
| 1,1,1,2-trichloroethane | 1.8 | 2.3 | 2.9 | 2.0 | 1.8 | 1.0 |
| 1,1-dichloroethane | 2.4 | 2.0 | 2.5 | 0.7 | 32.6 | 46.7 |
| Ethyl chloride | 0.0 | 0.0 | 0.0 | 0.0 | 2.8 | 8.2 |
| Other | 4.0 | 0.5 | 0.7 | 0.0 | 2.4 | a 4.5 | a Mostly 1,2-dichloroethane.

Obviously, though I prefer to hydrochlorinate the chlorination stream together with the ethylene for the sake of economy, the hydrochlorination can be done separately.

Examples can be multiplied indefinitely without departing from the scope of the invention, which is defined in the claims.

I claim:

1. The method of producing methyl chloroform from ethylene and chlorine, which comprises (1) feeding chlorine together with a recycle mixture of ethyl chloride, 1,1-dichloroethane and HCl obtained in Step 3, the mole ratio of chlorine to organics in said recycle mixture being from 1:2 to 3:1, into a reaction zone maintained at 340° to 450° C. to obtain a reaction mixture consisting essentially of vinyl chloride, vinylidene chloride, HCl and heavies including 1,2-dichloroethane; (2) distilling said reaction mixture to separate said heavies from the vinyl chloride, vinylidene chloride and HCl; (3) hydrochlorinating simultaneously in one reaction zone at a temperature of from 25° to 75° C. the vinyl chloride to produce 1,1-dichloroethane, the vinylidene chloride to produce methyl chloroform and ethylene as the sole source of fresh hydrocarbon in the process to produce ethyl chloride; (4) separating and recovering the methyl chloroform; and (5) recycling the 1,1-dichloroethane, ethyl chloride and excess HCl back to the chlorinator.

2. The method of claim 1, in which the vinyl chloride, vinylidene chloride and HCl are separated from the chlorination reaction mixture prior to hydrochlorination.

3. The method of claim 2, in which the hydrochlorination is conducted by introducing the reactants into a liquid body of an anhydrous carrier, of the group consisting of 1,1,2-trichloroethane and perchloroethylene, containing a hydrochlorination catalyst, at a temperature below 75° C., and maintaining the reactants in contact with the liquid body until a major portion of the ethylene, vinyl chloride and vinylidene chloride have been converted to ethyl chloride, 1,1-dichloroethane and methyl chloroform respectively.

4. The method of claim 3, in which the catalyst is ferric chloride.

5. The method of claim 3, in which the temperature is 25–55° C.

6. The method of claim 3, in which the hydrochlorination reaction is carried out continuously by feeding the reactants to a long column of the carrier containing the catalyst, and overflowing the suspension from near the top of the column.

7. The method of claim 6, in which the addition rate of organics to be hydrochlorinated is 5 to 20% of the liquid volume per hour, and the catalyst concentration is 1 to 5%.

References Cited

UNITED STATES PATENTS

| 3,304,337 | 2/1967 | Jordan et al. | 260—662 |
| 3,059,035 | 10/1972 | Benner et al. | 260—658 |

LEON ZITVER, Primary Examiner

A. SIEGEL, Assistant Examiner

U.S. Cl. X.R.

260—654 H, 656 R, 663

UNITED STATES PATENT OFFICE
CERTIFICATE OF CORRECTION

Patent No. 3,776,969      Dated December 4, 1973

Inventor(s) Walter Lobunez

It is certified that error appears in the above-identified patent and that said Letters Patent are hereby corrected as shown below:

Page 1 (drawing page), issue date of "Dec. 4, 1974" should read --Dec. 4, 1973--.

Column 2, line 54, "molar" should read --mol--.

Column 5, line 70, "mmol.mixture" should read --mmol/minute--.

Signed and Sealed this twentieth Day of January 1976

[SEAL]

Attest:

RUTH C. MASON
*Attesting Officer*

C. MARSHALL DANN
*Commissioner of Patents and Trademarks*